(12) United States Patent
Wood et al.

(10) Patent No.: US 9,009,483 B2
(45) Date of Patent: Apr. 14, 2015

(54) REPLACING BLINDED AUTHENTICATION AUTHORITY

(75) Inventors: Matthew D. Wood, Hillsboro, OR (US); Ernie Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/217,151

(22) Filed: Aug. 24, 2011

(65) Prior Publication Data

US 2011/0307704 A1    Dec. 15, 2011

Related U.S. Application Data

(63) Continuation of application No. 10/744,193, filed on Dec. 22, 2003.

(51) Int. Cl.
  *H04L 9/32*    (2006.01)
  *H04L 9/00*    (2006.01)
  *H04L 9/08*    (2006.01)
  *G06F 21/33*   (2013.01)
  *G06F 21/72*   (2013.01)

(52) U.S. Cl.
  CPC .............. *H04L 9/0891* (2013.01); *G06F 21/33* (2013.01); *G06F 21/72* (2013.01); *G06F 2221/2151* (2013.01); *H04L 9/3257* (2013.01); *H04L 9/3297* (2013.01)

(58) Field of Classification Search
  USPC ........ 713/180, 176, 178; 726/5, 6, 9; 380/277
  See application file for complete search history.

(56) References Cited

U.S. PATENT DOCUMENTS

| | | |
|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |

(Continued)

FOREIGN PATENT DOCUMENTS

| | | |
|---|---|---|
| DE | 4217444 | 12/1992 |
| EP | 0473913 | 3/1992 |

(Continued)

OTHER PUBLICATIONS

PCT Search Report for PCT/US2004/007040, dated Mar. 14, 2005.

(Continued)

*Primary Examiner* — Zachary A Davis
(74) *Attorney, Agent, or Firm* — Trop, Pruner & Hu, P.C.

(57) ABSTRACT

A manufacturing entity provides a blinded signature to a secure device and associates a time with the blinded signature. If a signing key is compromised, the manufacturing entity provides a time of the compromise and the time associated with the blinded signature to the replacement authority.

11 Claims, 2 Drawing Sheets

(56) References Cited

U.S. PATENT DOCUMENTS

| | | | |
|---|---|---|---|
| 4,419,724 A | | 12/1983 | Branigin et al. |
| 4,430,709 A | | 2/1984 | Schleupen |
| 4,521,852 A | | 6/1985 | Guttag |
| 4,529,870 A | | 7/1985 | Chaum |
| 4,571,672 A | | 2/1986 | Hatada et al. |
| 4,621,318 A | | 11/1986 | Maeda |
| 4,759,064 A | | 7/1988 | Chaum |
| 4,795,893 A | | 1/1989 | Ugon |
| 4,802,084 A | | 1/1989 | Ikegaya et al. |
| 4,825,052 A | | 4/1989 | Chemin et al. |
| 4,843,541 A | | 6/1989 | Bean et al. |
| 4,907,270 A | | 3/1990 | Hazard |
| 4,907,272 A | | 3/1990 | Hazard |
| 4,910,774 A | | 3/1990 | Barakat |
| 4,974,159 A | | 11/1990 | Hargrove et al. |
| 4,975,836 A | | 12/1990 | Hirosawa et al. |
| 5,007,082 A | | 4/1991 | Cummins |
| 5,022,077 A | | 6/1991 | Bealkowski et al. |
| 5,075,842 A | | 12/1991 | Lai |
| 5,079,737 A | | 1/1992 | Hackbarth |
| 5,187,802 A | | 2/1993 | Inoue et al. |
| 5,230,069 A | | 7/1993 | Brelsford et al. |
| 5,237,616 A | | 8/1993 | Abraham et al. |
| 5,255,379 A | | 10/1993 | Melo |
| 5,287,363 A | | 2/1994 | Wolf et al. |
| 5,293,424 A | | 3/1994 | Holtey et al. |
| 5,295,251 A | | 3/1994 | Wakui et al. |
| 5,317,705 A | | 5/1994 | Gannon et al. |
| 5,319,760 A | | 6/1994 | Mason et al. |
| 5,361,375 A | | 11/1994 | Ogi |
| 5,386,552 A | | 1/1995 | Garney |
| 5,421,006 A | | 5/1995 | Jablon et al. |
| 5,434,999 A | | 7/1995 | Goire et al. |
| 5,437,033 A | | 7/1995 | Inoue et al. |
| 5,442,645 A | | 8/1995 | Ugon et al. |
| 5,455,909 A | | 10/1995 | Blomgren et al. |
| 5,459,867 A | | 10/1995 | Adams et al. |
| 5,459,869 A | | 10/1995 | Spilo |
| 5,469,557 A | | 11/1995 | Salt et al. |
| 5,473,692 A | | 12/1995 | Davis |
| 5,479,509 A | | 12/1995 | Ugon |
| 5,488,716 A | | 1/1996 | Schneider et al. |
| 5,504,922 A | | 4/1996 | Seki et al. |
| 5,506,975 A | | 4/1996 | Onodera |
| 5,511,121 A | * | 4/1996 | Yacobi ............................ 705/69 |
| 5,511,217 A | | 4/1996 | Nakajima et al. |
| 5,522,075 A | | 5/1996 | Robinson et al. |
| 5,528,231 A | | 6/1996 | Patarin |
| 5,533,126 A | | 7/1996 | Hazard et al. |
| 5,555,385 A | | 9/1996 | Osisek |
| 5,555,414 A | | 9/1996 | Hough et al. |
| 5,560,013 A | | 9/1996 | Scalzi et al. |
| 5,564,040 A | | 10/1996 | Kubala |
| 5,566,323 A | | 10/1996 | Ugon |
| 5,568,552 A | | 10/1996 | Davis |
| 5,574,936 A | | 11/1996 | Ryba et al. |
| 5,581,615 A | | 12/1996 | Stern |
| 5,582,717 A | | 12/1996 | Di Santo |
| 5,604,805 A | | 2/1997 | Brands |
| 5,606,617 A | | 2/1997 | Brands |
| 5,615,263 A | | 3/1997 | Takahashi |
| 5,628,022 A | | 5/1997 | Ueno et al. |
| 5,628,023 A | | 5/1997 | Bryant et al. |
| 5,633,929 A | | 5/1997 | Kaliski, Jr. |
| 5,657,445 A | | 8/1997 | Pearce |
| 5,668,971 A | | 9/1997 | Neufeld |
| 5,680,547 A | | 10/1997 | Chang |
| 5,684,948 A | | 11/1997 | Johnson et al. |
| 5,706,469 A | | 1/1998 | Kobayashi |
| 5,717,903 A | | 2/1998 | Bonola |
| 5,720,609 A | | 2/1998 | Pfefferle |
| 5,721,222 A | | 2/1998 | Bernstein et al. |
| 5,729,760 A | | 3/1998 | Poisner |
| 5,737,604 A | | 4/1998 | Miller et al. |
| 5,737,760 A | | 4/1998 | Grimmer, Jr. et al. |
| 5,740,178 A | | 4/1998 | Jacks et al. |
| 5,752,046 A | | 5/1998 | Oprescu et al. |
| 5,757,919 A | | 5/1998 | Herbert et al. |
| 5,764,969 A | | 6/1998 | Kahle |
| 5,796,835 A | | 8/1998 | Saada |
| 5,796,845 A | | 8/1998 | Serikawa et al. |
| 5,805,712 A | | 9/1998 | Davis |
| 5,809,546 A | | 9/1998 | Greenstein et al. |
| 5,815,665 A | | 9/1998 | Teper et al. |
| 5,825,875 A | | 10/1998 | Ugon |
| 5,825,880 A | | 10/1998 | Sudia et al. |
| 5,832,089 A | * | 11/1998 | Kravitz et al. .................. 705/69 |
| 5,835,594 A | | 11/1998 | Albrecht et al. |
| 5,844,986 A | | 12/1998 | Davis |
| 5,852,717 A | | 12/1998 | Bhide et al. |
| 5,854,913 A | | 12/1998 | Goetz et al. |
| 5,867,577 A | | 2/1999 | Patarin |
| 5,872,844 A | * | 2/1999 | Yacobi ............................ 705/69 |
| 5,872,994 A | | 2/1999 | Akiyama et al. |
| 5,890,189 A | | 3/1999 | Nozue et al. |
| 5,900,606 A | | 5/1999 | Rigal |
| 5,901,225 A | | 5/1999 | Ireton et al. |
| 5,901,229 A | * | 5/1999 | Fujisaki et al. ................. 380/30 |
| 5,903,752 A | | 5/1999 | Dingwall et al. |
| 5,919,257 A | | 7/1999 | Trostle |
| 5,935,242 A | | 8/1999 | Madany et al. |
| 5,935,247 A | | 8/1999 | Pai et al. |
| 5,937,063 A | | 8/1999 | Davis |
| 5,944,821 A | | 8/1999 | Angelo |
| 5,953,422 A | | 9/1999 | Angelo et al. |
| 5,953,502 A | | 9/1999 | Helbig, Sr. |
| 5,956,408 A | | 9/1999 | Arnold |
| 5,970,147 A | | 10/1999 | Davis et al. |
| 5,978,475 A | | 11/1999 | Schneier et al. |
| 5,978,481 A | | 11/1999 | Ganesan et al. |
| 5,987,131 A | | 11/1999 | Clapp |
| 5,987,557 A | | 11/1999 | Ebrahim |
| 5,999,627 A | | 12/1999 | Lee et al. |
| 6,014,745 A | | 1/2000 | Ashe |
| 6,035,374 A | | 3/2000 | Panwar et al. |
| 6,044,478 A | | 3/2000 | Green |
| 6,055,637 A | | 4/2000 | Hudson et al. |
| 6,058,478 A | | 5/2000 | Davis |
| 6,061,794 A | | 5/2000 | Angelo |
| 6,075,938 A | | 6/2000 | Bugnion et al. |
| 6,085,296 A | | 7/2000 | Karkhanis et al. |
| 6,088,262 A | | 7/2000 | Nasu |
| 6,092,095 A | | 7/2000 | Maytal |
| 6,093,213 A | | 7/2000 | Favor et al. |
| 6,101,584 A | | 8/2000 | Satou et al. |
| 6,108,644 A | | 8/2000 | Goldschlag et al. |
| 6,115,816 A | | 9/2000 | Davis |
| 6,125,430 A | | 9/2000 | Noel et al. |
| 6,131,166 A | | 10/2000 | Wong-Insley |
| 6,138,239 A | | 10/2000 | Veil |
| 6,148,379 A | | 11/2000 | Schimmel |
| 6,158,546 A | | 12/2000 | Hanson et al. |
| 6,173,417 B1 | | 1/2001 | Merrill |
| 6,175,924 B1 | | 1/2001 | Arnold |
| 6,175,925 B1 | | 1/2001 | Nardone et al. |
| 6,178,509 B1 | | 1/2001 | Nardone |
| 6,182,089 B1 | | 1/2001 | Ganapathy et al. |
| 6,188,257 B1 | | 2/2001 | Buer |
| 6,192,455 B1 | | 2/2001 | Bogin et al. |
| 6,199,152 B1 | | 3/2001 | Kelly et al. |
| 6,205,550 B1 | | 3/2001 | Nardone et al. |
| 6,212,635 B1 | | 4/2001 | Reardon |
| 6,222,923 B1 | | 4/2001 | Schwenk |
| 6,249,872 B1 | | 6/2001 | Wildgrube et al. |
| 6,252,650 B1 | | 6/2001 | Nakamura |
| 6,269,392 B1 | | 7/2001 | Cotichini et al. |
| 6,272,533 B1 | | 8/2001 | Browne et al. |
| 6,272,637 B1 | | 8/2001 | Little et al. |
| 6,275,933 B1 | | 8/2001 | Fine et al. |
| 6,282,650 B1 | | 8/2001 | Davis |
| 6,282,651 B1 | | 8/2001 | Ashe |
| 6,282,657 B1 | | 8/2001 | Kaplan et al. |
| 6,292,874 B1 | | 9/2001 | Barnett |
| 6,301,646 B1 | | 10/2001 | Hostetter |

(56) References Cited

U.S. PATENT DOCUMENTS

| | | |
|---|---|---|
| 6,308,270 B1 | 10/2001 | Guthery et al. |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,473,508 B1 | 10/2002 | Young et al. |
| 6,473,800 B1 | 10/2002 | Jerger et al. |
| 6,496,847 B1 | 12/2002 | Bugnion et al. |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,615,347 B1 * | 9/2003 | de Silva et al. ............... 713/156 |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 6,795,966 B1 | 9/2004 | Lim et al. |
| 6,804,630 B2 | 10/2004 | Lee et al. |
| 6,871,276 B1 * | 3/2005 | Simon ............... 713/156 |
| 6,959,086 B2 | 10/2005 | Ober et al. |
| 6,988,250 B1 | 1/2006 | Proudler et al. |
| 6,990,579 B1 | 1/2006 | Herbert et al. |
| 6,996,710 B1 | 2/2006 | Ellison et al. |
| 7,013,481 B1 | 3/2006 | Ellison et al. |
| 7,028,149 B2 | 4/2006 | Grawrock et al. |
| 7,103,529 B2 | 9/2006 | Zimmer |
| 7,103,771 B2 | 9/2006 | Grawrock |
| 7,133,990 B2 | 11/2006 | Link et al. |
| 7,165,181 B2 * | 1/2007 | Brickell ............... 713/182 |
| 7,167,564 B2 * | 1/2007 | Asano et al. ............... 380/279 |
| 7,272,831 B2 | 9/2007 | Cota-Robles et al. |
| 7,287,030 B2 * | 10/2007 | Margolus et al. ............... 713/176 |
| 7,356,701 B2 * | 4/2008 | Margolus et al. ............... 713/176 |
| 7,370,196 B2 * | 5/2008 | Simon ............... 713/156 |
| 7,463,739 B2 * | 12/2008 | Couillard ............... 380/284 |
| 7,571,324 B2 * | 8/2009 | Canard et al. ............... 713/180 |
| 8,037,314 B2 * | 10/2011 | Wood et al. ............... 713/180 |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0004900 A1 | 1/2002 | Patel |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0154782 A1 * | 10/2002 | Chow et al. ............... 380/278 |
| 2002/0166061 A1 | 11/2002 | Falik et al. |
| 2002/0169717 A1 | 11/2002 | Challener |
| 2003/0002668 A1 | 1/2003 | Graunke et al. |
| 2003/0018892 A1 | 1/2003 | Tello |
| 2003/0028807 A1 | 2/2003 | Lawman et al. |
| 2003/0037089 A1 | 2/2003 | Cota-Robles et al. |
| 2003/0037246 A1 | 2/2003 | Goodman et al. |
| 2003/0074548 A1 | 4/2003 | Cromer et al. |
| 2003/0093687 A1 | 5/2003 | Westhoff et al. |
| 2003/0112008 A1 | 6/2003 | Hennig |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188156 A1 | 10/2003 | Yasala et al. |
| 2003/0188179 A1 | 10/2003 | Challener et al. |
| 2003/0196085 A1 | 10/2003 | Lampson et al. |
| 2003/0226031 A1 | 12/2003 | Proudler et al. |
| 2003/0226040 A1 | 12/2003 | Challener et al. |
| 2003/0231328 A1 | 12/2003 | Chapin et al. |
| 2003/0235175 A1 | 12/2003 | Naghian et al. |
| 2004/0003288 A1 | 1/2004 | Wiseman et al. |
| 2004/0103281 A1 | 5/2004 | Brickell |
| 2004/0117539 A1 | 6/2004 | Bennett et al. |
| 2004/0128345 A1 | 7/2004 | Robinson et al. |
| 2004/0128670 A1 | 7/2004 | Robinson et al. |
| 2004/0193888 A1 | 9/2004 | Wiseman et al. |
| 2004/0205341 A1 | 10/2004 | Brickell |
| 2005/0021968 A1 | 1/2005 | Zimmer |
| 2005/0069135 A1 | 3/2005 | Brickell |
| 2005/0071677 A1 | 3/2005 | Khanna et al. |
| 2005/0132202 A1 | 6/2005 | Dillaway et al. |
| 2005/0137889 A1 | 6/2005 | Wheeler |
| 2005/0137898 A1 | 6/2005 | Wood |
| 2009/0041232 A1 | 2/2009 | Brickell |

FOREIGN PATENT DOCUMENTS

| | | |
|---|---|---|
| EP | 0600112 | 6/1994 |
| EP | 0602867 | 6/1994 |
| EP | 0892521 | 1/1999 |
| EP | 0930567 | 7/1999 |
| EP | 0695902 | 12/1999 |
| EP | 0961193 | 12/1999 |
| EP | 1030237 | 8/2000 |
| EP | 1055989 | 11/2000 |
| EP | 1056014 | 11/2000 |
| EP | 1085396 | 3/2001 |
| EP | 1146715 | 10/2001 |
| EP | 1209563 | 5/2002 |
| EP | 1271277 | 1/2003 |
| FR | 2620248 | 3/1989 |
| FR | 2700430 | 7/1994 |
| FR | 2714780 | 7/1995 |
| FR | 2742618 | 6/1997 |
| FR | 2752122 | 2/1998 |
| FR | 2763452 | 11/1998 |
| FR | 2830147 | 3/2003 |
| JP | 2000076139 | 3/2000 |
| JP | 200694114 | 4/2006 |
| WO | WO9524696 | 9/1995 |
| WO | WO9729567 | 8/1997 |
| WO | WO9812620 | 3/1998 |
| WO | WO9834365 | 8/1998 |
| WO | WO9844402 | 10/1998 |
| WO | WO9909482 | 1/1999 |
| WO | WO9905600 | 2/1999 |
| WO | WO9918511 | 4/1999 |
| WO | WO9957863 | 11/1999 |
| WO | WO9965579 | 12/1999 |
| WO | WO0021238 | 4/2000 |
| WO | WO0062232 | 10/2000 |
| WO | WO0127723 | 4/2001 |
| WO | WO0127821 | 4/2001 |
| WO | WO0163994 | 8/2001 |
| WO | WO0175564 | 10/2001 |
| WO | WO0175565 | 10/2001 |
| WO | WO0201794 | 1/2002 |
| WO | WO0217555 | 2/2002 |
| WO | WO02060121 | 8/2002 |

(56) References Cited

FOREIGN PATENT DOCUMENTS

| WO | WO02086684 | 10/2002 |
|---|---|---|
| WO | WO03058412 | 7/2003 |

OTHER PUBLICATIONS

"Office Action for U.S. Appl. No. 10/185,123, dated Apr. 16, 2007", 10 pages.
"Office Action for U.S. Appl. No. 10/663,206, dated Apr. 19, 2007", 25 pages.
"Office Action for U.S. Appl. No. 10/814,569, dated Apr. 5, 2007", 5 pages.
"PCT Search Report for PCT/US2005/010156, dated Aug. 22, 2006", 6 pages.
"Written Opinion of the International Searching Authority", PCT/US2004/007040, (Oct. 27, 2005), 13 pgs.
Ateniese, Giuseppe, et al., "A Practical and Provably Secure Coalition-Resistant Group Signature Scheme", *Advances in Cryptology—CRYPTO2000, vol. 1880 of Lecture Notes in Computer Science*, Int'; Assoc for Crypt Res, Spring-Verlag, Berlin, Germany, (2000), 16 pages.
Berg, Cliff, "How do I create a Signed Applet?", *Dr. Dobb's Journal*, (Aug. 1997), 1-9.
Brands, Stefan, "Restrictive Blinding of Secret-Key Certificates", *Springer-Verlag XP002201306*, (1995), Chapter 3.
Carvalho, "Subject Domain Organisation and Teaching Strategy for Distance Learning in the UnB Virtual Project", *2002 IEEE*, obtained from http://lttf.ieee.org/icalt2002/proceedings/t803_icalt042_End.pdf 2002, iEEE, pp. 1-4.
Chien, Andrew A., et al., "Safe and Protected Execution for the Morph/AMRM Reconfigurable Processor", *7th Annual IEEE Symposium, FCCM '99 Proceedings*, XP010359180, ISBN 0-7695-0375-6, Los Alamitos, CA, (Apr. 21, 1999), 209-221.
Compaq Computer Corporation, "Trusted Computing Platform Alliance (TCPA) Main Specification Version 1.1a", XP002272822, (Jan. 25, 2001), 1-166.
Compaq Computer Corporation, "Trusted Computing Platform Alliance (TCPA) Main Specification Version 1.1a", XP002272822, (Jan. 25, 2001), 167-333.
Coulouris, George, et al., "Distributed Systems, Concepts and Designs", *2nd Edition*, (1994), 422-424.
Crawford, John, "Architecture of the Intel 80386", *Proceedings of the IEEE International Conference on Computer Design: VLSI in Computers and Processors* (ICCD '86), (Oct. 6, 1986), 155-160.
Davida, George I., et al., "Defending Systems Against Viruses through Cryptographic Authentication", *Proceedings of the Symposium on Security and Privacy*, IEEE Comp. Soc. Press, ISBN 0-8186-1939-2, (May 1989), 8 pages.
Fabry, R.S., "Capability-Based Addressing", Fabry, R.S., "Capability-Based Addressing," *Communications of the ACM*, vol. 17, No. 7, (Jul. 1974), 403-412.
Frieder, Gideon, "The Architecture and Operational Characteristics of the VMX Host Machine", *The Architecture and Operational Characteristics of the VMX Host Machine, IEEE*, (1982), 9-16.
Goldberg, Robert P., "Survey of Virtual Machine Research", *Computer Magazine*, (Jun. 1974), 34-45.
Gong, Li, et al., "Going Beyond the Sandbox: An Overview of the New Security Architecture in the Java Development Kit 1.2", *Proceedings of the USENIX Symposium on Internet Technologies and Systems*, Monterey, CA, (Dec. 1997), 1-11.
Gum, P. H., "System/370 Extended Architecture: Facilities for Virtual Machines", *IBM J. Research Development*, vol. 27, No. 6, (Nov. 1983), 530-544.
Hall, Judith S., et al., "Virtualizing the VAX Architecture", *ACM SIGARCH Computer Architecture News, Proceedings of the 18th Annual International Symposium on Computer Architecture*, vol. 19, Issue No. 3, (Apr. 1991), 10 pages.
Heinrich, Joe, "MIPS R4000 Microprocessor User's Manual, Second Edition", Chapter 4 *"Memory Management"*, (Jun. 11, 1993), 61-97.

HP Mobile Security Overview, "HP Mobile Security Overview", (Sep. 2002), 1-10.
IBM, "Information Display Technique for a Terminate Stay Resident Program IBM Technical Disclosure Bulletin", TDB-ACC-No. NA9112156, vol. 34, Issue 7A, (Dec. 1, 1991), 156-158.
IBM Corporation, "IBM ThinkPad T30 Notebooks", *IBM Product Specification*, located at www-1.ibm.com/services/files/cisco_t30_spec_sheet_070202.pdf, last visited Jun. 23, 2004, (Jul. 2, 2002), 1-6.
Intel Corporation, "IA-32 Intel Architecture Software Developer's Manual", *vol. 3: System Programming Guide*, Intel Corporation—2003, 13-1 through 13-24.
Intel Corporation, "IA-64 System Abstraction Layer Specification", *Intel Product Specification*, Order No. 245359-001, (Jan. 2000), 1-47.
Intel Corporation, "82802AB/82802AC Firmware Hub (FWH)", *Intel Product Datasheet*, Document No. 290658-004, (Nov. 2000), 1-6, 17-28.
Intel Corporation, "Intel IA-64 Architecture Software Developer's Manual", *vol. 2: IA-64 System Architecture*, Order No. 245318-001, (Jan. 2000), i, ii, 5.1-5.3, 11.1-11.8, 11.23-11.26.
Intel Corporation, "Intel386 DX Microprocessor 32-Bit CHMOS Microprocessor with Integrated Memory Management", (1995), 5-56.
Karger, Paul A., et al., "A VMM Security Kernal for the VAX Architecture", *Proceedings of the Symposium on Research in Security and Privacy*, XP010020182, ISBN 0-8186-2060-9, Boxborough, MA, (May 7, 1990), 2-19.
Kashiwagi, Kazuhiko, et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Compute. Soc, US, ISBN 0-8186-7638-8, (1996), 278-287.
Lawton, Kevin, et al., "Running Multiple Operating Systems Concurrently on an IA32 PC Using Virtualization Techniques", http://www.plex86.org/research/paper.txt, (Nov. 29, 1999), 1-31.
Luke, Jahn, et al., "Replacement Strategy for Aging Avionics Computers", *IEEE AES Systems Magazine*, XP002190614, (Mar. 1999), 1-6.
Menezes, Alfred J., et al., "Handbook of Applied Cryptography", *CRC Press LLC*, USA XP002201307, (1997), 475.
Menezes, Alfred J., et al., "Handbook of Applied Cryptography", *CRC Press Series on Discrete Mathematics and its Applications*, Boca Raton, FL, XP002165287, ISBN 0849385237, (Oct. 1996), 403-405, 506-515, 570.
Micciancio, Daniele, et al., "Efficient and Concurrent Zero-Knowledge from any public coin HVZK protocol", XP-002313884, [Online], Retrieved from the Internet: URL:http://eprint.iarc.org/2002/090.pdf> [retrieved on Sep. 2, 2004], (Jul. 8, 2002), 20 pgs.
Motorola, "M68040 User's Manual", (1993), pp. 1-96.
Nanba, S., et al., "VM/4: ACOS-4 Virtual Machine Virtual Machine Architecture", *VM/4: ACOS-4 Virtual Machine Architecture, IEEE*, (1985), 171-178.
Prabhakaran, Manoj, et al., "Concurrent Zero Knowledge Proffs with Logarithimic Round-Complexity", XP002313883, [Online] Retrieved from the Internet: URL:http://eprint.iacr.org/2002/055.pdf> [retrieved on Sep. 22, 2004], (May 6, 2002), 20 pgs.
Richt, Stefan, et al., "In-Circuit-Emulator Wird Echtzeittauglich", *Elektronic, Franzis Verlag GMBH*, Munchen, DE, vol. 40, No. 16, XP000259620, (Aug. 6, 1991), 4 pages.
Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000), 1-18.
Rosenberg, Jonathan B., "How Debuggers Work (Algorithms, Data Structures, and Architecture", *Chapters 3 and 5 Hardware Debugger Facilities, Wiley Computer Publishing*, United States, (1996), pp. 42-43, 95, 96 and 99.
Rosenblum, M., "Virtual Platform: A Virtual Machine Monitor for Commodity PC", *Proceedings of the 11th Hotchips Conference*, (Aug. 17, 1999), 185-196.
RSA Security, "Hardware Authenticators", www.rsasecurity.com/node.asp?id=1158, 1-2.

(56) References Cited

OTHER PUBLICATIONS

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Saez, Sergio, et al., "A Hardware Scheduler for Complex Real-Time Systems", *Proceedings of the IEEE International Symposium on Industrial Electronics*, XP002190615, (Jul. 1999), 43-48.

Schneier, Bruce, "Applied Cryptography: Protocols, Algorithm, and Source Code in C", *Wiley, John & Sons. Inc.*, XP002939871; ISBN 0471117099, (Oct. 1995), 47-52.

Schneier, Bruce, "Applied Cryptography: Protocols, Algorithm, and Source Code in C", *Wiley, John & Sons, Inc.*, XP002138607; ISBN 0471117099, (Oct. 1995), 56-65.

Schneier, Bruce, "Applied Cryptography: Protocols, Algorithms, and Source Code C", *Wiley, John & Sons, Inc.*, XP0021111449; ISBN 0471117099, (Oct. 1995), 169-187.

Schneier, Bruce, "Applied Cryptography: Protocols, Algorithms, and Source Code in C", *2nd Edition; Wiley, John & Sons, Inc.*, XP002251738; ISBN 0471128457, (Nov. 1995), 28-33; 176-177; 216-217; 461-473; 518-522.

Sherwood, Timothy, et al., "Patchable Instruction ROM Architecture", *Department of Computer Science and Engineering, University of California, San Diego, La Jolla, CA*, (Nov. 2001), pp. 1-20.

Tung, Brian, "The Moron's Guide to Kerberos, Version 1.2.2", [Online] Retrieved on the Internet at: http://www/web.archive.org/web/20000815233731/http://www.is.edu/~brian/security/kerberos.html., Retrieved on Oct. 4, 2006, (Dec. 2006), 11 pgs.

Wenisch, et al., "Store-Ordered Streaming of Shared Memory", *Proceedings of the 14th Int'l Conference on Parallel Architectures and Compilation Techniques (PACT'05)* Sep. 2005, IEEE, pp. 75-84.

Zemor, Gilles, "Cours de Crytopgraphy", XP002313885, Cassinni, Paris, ISBN 2-544225-020-6, (Nov. 2000), 165-173.

Final Office Action for U.S. Appl. No. 10/744,193 Mailed Aug. 31, 2010, 32 Pages.

Non-Final Office Action for U.S. Appl. No. 10/744,193 Mailed Jul. 20, 2009, 26 Pages.

Notice of Allowance and Fees for U.S. Appl. No. 10/744,193 Mailed Jun. 2, 2011, 17 Pages.

Notice of Allowance and Fees for U.S. Appl. No. 10/744,429 Mailed Apr. 30, 2009, 21 Pages.

Non-Final Office Action for Japanese Patent Application No. 2006-506953 Mailed Apr. 13, 2010, 6 Pages.

Non-Final Office Action for Japanese Patent Application No. 2006-506953 Mailed Jun. 2, 2009, 10 Pages.

Non-Final Office Action for India Patent Application No. 4315/DELNP/2005 Mailed Jan. 6, 2009, 2 Pages.

Non-Final Office Action for European Patent Application No. 04718163.1 Mailed Apr. 12, 2007, 5 Pages.

Non-Final Office Action for European Patent Application No. 04718163.1 Mailed Mar. 25, 2009, 3 Pages.

Non-Final Office Action for U.S. Appl. No. 12/257,005 Mailed Oct. 9, 2009, 14 Pages.

Final Office Action for U.S. Appl. No. 12/257,005 Mailed Apr. 16, 2010, 18 Pages.

Notice of Allowance and Fees for U.S. Appl. No. 10/412,366 Mailed Jun. 23, 2008, 7 Pages.

Notice of Allowance and Fees for U.S. Appl. No. 10/65,165 Mailed Nov. 30, 2007, 10 Pages.

First Non-Final Office Action for China Patent Application No. 200480016181.1 Mailed May 8, 2009, 13 Pages.

Second Non-Final Office Action for China Patent Application No. 200480016181.1 Mailed Sep. 25, 2009, 9 Pages.

Third Non-Final Office Action for China Patent Application No. 200480016181.1 Mailed Jan. 15, 2010, 6 Pages.

Fourth Non-Final Office Action for China Patent Application No. 200480016181.1 Mailed May 19, 2010, 3 Pages.

Fifth Non-Final Office Action for China Patent Application No. 200480016181.1 Mailed Nov. 12, 2010, 4 Pages.

Seventh Non-Final Office Action for China Patent Application No. 200480016181.1 Mailed Feb. 13, 2012, 11 Pages.

Eighth Non-Final Office Action for China Patent Application No. 200480016181.1 Mailed Jul. 9, 2012, 9 Pages.

Non-Final Office Action for China Patent Application No. 200480016181.1 Mailed Aug. 25, 2011, 10 Pages.

"Trusted Computing Platform Alliance (TCPA) Main Specification Version 1.1b", Published Feb. 22, 2002; retrieved from the Internet: https://www.trustedcomputinggroup.org/specs/TPM/TCPA_Main_TCG_Architecture_v1_1b.pdf; 29 pages, Previously published as: Trusted Computing Platform Alliance (TCPA) Main Specification Version 1.1a.

Chaum, David, "Security Without Identification: Transaction Systems to make Big Brother Obsolete", Communications of the ACM; Oct. 1985, vol. 28; No. 10, pp. 1030-1044.

First Office Action mailed Oct. 13, 2006 for U.S. Appl. No. 10/412,366.

Final Office Action mailed Jan. 24, 2007 for U.S. Appl. No. 10/412,366.

Third Office Action mailed Jul. 3, 2007 for U.S. Appl. No. 10/412,366.

Second Final Office Action mailed Oct. 10, 2007 for U.S. Appl. No. 10/412,366.

Fifth Office Action mailed Jan. 15, 2008 for U.S. Appl. No. 10/412,366.

First Office Action mailed Oct. 2, 2007 for U.S. Appl. No. 10/744,193.

Final Office Action mailed Sep. 3, 2008 for U.S. Appl. No. 10/744,193.

First Office Action mailed Dec. 29, 2006 for U.S. Appl. No. 10/744,429.

Second Office Action mailed Jul. 26, 2007 for U.S. Appl. No. 10/744,429.

Final Office Action mailed Feb. 4, 2008 for U.S. Appl. No. 10/744,429.

Fourth Office Action mailed Jul. 30, 2008 for U.S. Appl. No. 10/744,429.

Final Office Action for U.S. Appl. No. 10/744,429 mailed Jan. 2, 2009.

First Office Action mailed Oct. 17, 2006 for U.S. Appl. No. 10/675,165.

Second Office Action mailed Jul. 26, 2007 for U.S. Appl. No. 10/675,165.

* cited by examiner

Figure 1

REPLACING BLINDED AUTHENTICATION AUTHORITY

RELATED APPLICATION

This application is a continuation application of and claims priority to U.S. application Ser. No. 10/744,193 filed on Dec. 22, 2003.

BACKGROUND

A general purpose device such as a processor based system, for example, a personal or handheld computer, or a dedicated device such as an automated teller machine, may communicate with an entity, such as a server for a service provider, in a secure manner. The device, when interacting in such a manner, may be termed a secure device. In one example, a personal computer user may desire to use the computer, including software such as a browser executing on an operating system, as a secure device to access a stock account on the web.

The interacting entity may require that the device possess specific security related attributes before the entity communicates with the device. In the above example, prior to providing access, the stockbroker's web server may seek reliable information regarding security related characteristics of the user's computer and software executing on the computer. In general, this problem is solved by a certificate such as a digital certificate signed by the manufacturer of the secure device that makes a representation about the attributes of the secure device. In the example under consideration, this may be a signed digital certificate provided by the browser and signed by the manufacturer of the browser, or one provided by the operating system and signed by the manufacturer of the operating system, or provided directly by the computer hardware and signed by the hardware manufacturer, or some other type of certificate that assures the interacting entity, in this case the stockbroker's web server, that the device has certain characteristics or meets certain standards. Such a certificate could represent, for example, the level of encryption supported by the browser, or the existence and type of secure interconnection between the computer and any external peripherals. Such a certificate could also represent a hardware device in the platform that holds a cryptographic key and was manufactured to protect the key using specified protections.

In general, therefore, a manufacturing entity that is either the manufacturer itself or authorized by the manufacturer, may have signed several certificates that provide information about the capabilities of several secure devices provided by the manufacturer.

Occasionally, the signing key of the manufacturer may be compromised, for example, it may become known to an unauthorized party. This consequently prevents any device that subsequently authenticates itself to another entity using the manufacturer's signed certificate from guaranteeing its security related characteristics because the unauthorized party may have signed the certificate and the device certificate may thereby make a false representation about its security characteristics. Thus, bona fide devices that have been provided using the manufacturing entity's certificate prior to the signing key compromise must be issued a new certificate signed by a new un-compromised key that provides the same level of trust in the certificate as before the compromise.

The mechanism by which this may be achieved requires the manufacturing entity to maintain a list of the secure devices to which it has provided a signed certificate, and a secure time stamp recording a time earlier than the time at which the certificate was signed, for each secure device so authenticated. The combination of the signed certificate and the time stamp provides a guaranteed record of the secure device's state at that time of the signing with respect to the attributes represented by the certificate. Once a compromise occurs, a replacement authority, which may be the manufacturing entity itself or a physically separate entity, can then use the record to assign new certificates to the secure devices that are known to have been certified by the manufacturing entity prior to the compromise.

The replacement authority, on being notified, of the compromise generates a replacement signing key. Using the replacement key, the replacement authority then generates a new certificate for every secure device known to have a bona fide certificate previously provided by the manufacturing entity and not created as a result of the compromise. These certificates are then distributed to the bona fide secure devices; in one instance by having the secure devices download them from a distribution server.

The above replacement scenario is complicated when the process of signing certificates for secured devices is blinded. In a blinded signing, a secure device may obtain certificates from a manufacturing entity while keeping its identity hidden from the manufacturing entity. A secure device may in one class of implementations provide a manufacturing entity with information placing it in a known class of trusted devices without revealing its identity. This may be achieved by a protocol such as that described in, for example, Chaum, D. *Security without identification: transaction systems to make big brother obsolete. Comm. of the ACM.* 28(10):1030-1044; 1985 (Chaum). However, in such a blinded signing scenario, because the identity of the secure device is essentially unknowable to the manufacturing entity, it is not possible for the entity to provide information about the secure devices that have bona fide certificates to a replacement authority in the straightforward manner described earlier if a compromise of the manufacturing entity's signing key occurs.

DETAILED DESCRIPTION

Figure 1:
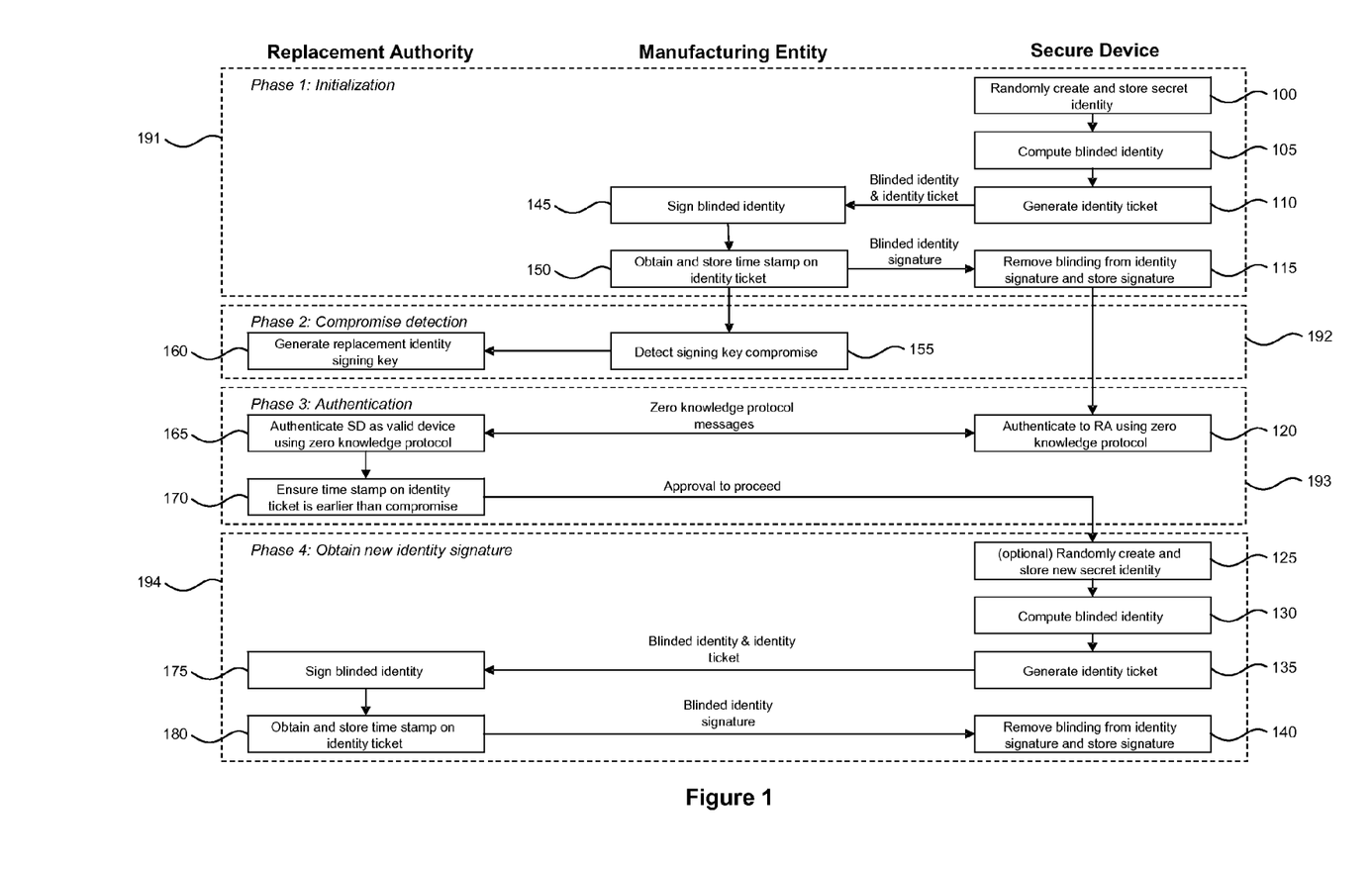
FIG. 1 Depicts a flowchart of processing in one embodiment of the claimed subject matter.

FIG. 1 depicts processing in accordance with one embodiment of the claimed subject matter. In the figure, the processing at three sites is depicted, viz. at a manufacturing entity, at a secure device, and at a replacement authority. The depicted processing can be divided into four phases as shown in the figure. In the first phase, initialization, represented by box 191, a secure device and a manufacturing entity participate to create a signed certificate for the secure device signed by the manufacturing entity using a blinded signing process. In the second phase, compromise detection, represented by box 192, the manufacturing entity detects a compromise and notifies a replacement authority. In the third phase, authentication, represented by box 193, the replacement authority and the secure device communicate in order to establish to the replacement authority that the secure device is bona fide and has been properly certified by the manufacturing authority prior to the compromise. In the final phase, obtain new identity signature, the secure device and the replacement authority interact to create a new signed certificate for the secure device, once again using a blinded signing process.

The phases depicted in the figure are meant to teach a specific embodiment of the claimed subject matter. In other embodiments, many variations of the depicted processing are possible. For example, the replacement authority may be identical to the manufacturing entity in some embodiments. A single secure device in some embodiments may interact with multiple manufacturing entities and/or multiple replacement authorities. Conversely, the manufacturing entity may interact with multiple secure devices in some embodiments. In some embodiments, more than one certificate may be provided by a manufacturing entity to a particular secure device.

Next, initialization for this embodiment, as depicted in FIG. 1 at 191, is considered in detail. In this phase, the secure device first generates a secret identity, 100. This may be done, in one embodiment, by a process that generates a randomized sequence of bits to be used as the secret identity. In other embodiments the identity may be pre-provided by the manufacturer of the secure device or by a user, for example by entering a pass-phrase. In order to prevent the manufacturing entity from learning the device's secret identity while obtaining a certificate from the entity, the secure device then computes a blinded identity, 105, using a method such as that described in Chaum. The blinded identity is provided to the manufacturing entity for a signature in order to obtain a certificate. In addition, the secure device also generates a blinded identity ticket at step 110. This identity ticket is generated, in one embodiment, by applying a one-way function to the secret identity of the device. The ticket is transmitted to the manufacturing entity in this step.

The generation of the blinded identity ticket is done in a manner that allows later authentication by a replacement authority that the ticket was generated using the secret identity of the secure device, without requiring the secure device to actually disclose the secret identity. A method to achieve this property for a blinded identity ticket is described in detail in the pending U.S. patent application entitled SYSTEM AND METHOD FOR ESTABLISHING TRUST WITHOUT REVEALING IDENTITY, applicant Ernie F. Brickell, application Ser. No. 10/306,336, and assigned to Intel Corporation (Brickell). This method is termed the Direct Proof method and is used in this embodiment of the claimed subject matter. Specifically, the one-way function referenced above and used to compute the blinded identity ticket for the secure device from the secret identity of the device at step 110 is in accordance with Brickell. The Direct Proof method of Brickell is not detailed further in this application because the referenced co-pending application describes the method in detail. Of course, other methods that allow the creation of a blinded identity ticket that allows a replacement authority to authenticate a secure device without requiring the revelation of the secret identity of the secure device may be used in other embodiments in a step analogous to step 110 of this embodiment. Using the Brickell method, the identity ticket can be created by having the device perform a Direct Proof with a named base provided by the manufacturer or by the replacement authority, as described in the Brickell application.

Once the manufacturing entity has received the blinded identity and the identity ticket, it signs the blinded identity and returns it to the secure device at step 145 and then obtains a secure timestamp on the identity ticket indicating the time of signing and stores the identity ticket and the time stamp at step 150. Using a method such as that described in Chaum, the secure device in 115 then removes the blinding from the signed blinded identity to obtain a signed certificate from the manufacturing entity and stores the certificate for normal authentication of the device as a secure device as described in the Background section above.

The next stage of processing begins when the manufacturing entity detects a compromise of its signing key and in response to the compromise contacts the replacement authority, at 155, to initiate a certificate replacement process for secure devices that have previously received bona fide certificates from the manufacturing entity. The manufacturing entity at this stage has already provided or provides in a communication to the replacement authority the identity tickets of all bona fide secure devices whose certificates are to be replaced. In response to the request from the manufacturing entity, the replacement authority generates a new signing key for the new certificates to be issued at 160.

The first step in the certificate replacement process, box 193, is for the replacement authority to authenticate any secure device which is seeking a replacement for its original certificate. The replacement authority initiates a zero knowledge protocol with the secure device using, for example, the Direct Proof techniques of Brickell, and authenticates it using the information contained in the identity ticket, at 165 and 120. Once the secure device is authenticated as a possessor of the secret identity that was used to create the identity ticket using, for example, Direct Proof techniques, the replacement authority then checks to ensure that the secure device had a bona fide certificate provided by the manufacturing entity prior to the compromise by comparing the time stamp associated with the identity ticket with the estimated time of compromise, 170. The estimated time of compromise in general is no later than the time at which the compromise is detected. Once the time stamp has been validated to have been created earlier than the estimated time of compromise, the replacement authority and secure device in box 194 repeat a process similar to the previously described initialization process (box 191) to generate a new certificate using the new signing key. The difference is that in this instance the replacement authority is providing the certificate to the secure device instead of the manufacturing entity (though in practice the replacement authority may in some embodiments be identical to the manufacturing entity). As before, this process includes the secure device computing a blinded identity and generating an identity ticket at 130 and 135; the replacement authority signing the blinded identity and storing the identity ticket and the time of signing of the identity as a time stamp on the identity ticket at 175 and 180; and the secure device obtaining a certificate by removing the blinding from the signed blinded identity at 140. The secure device may also optionally choose to generate an entirely new secret identity at the start of the process at 125; or alternatively it may continue to use its former secret identity because the secrecy of that identity is uncompromised in the scenario described here.

Figure 2:
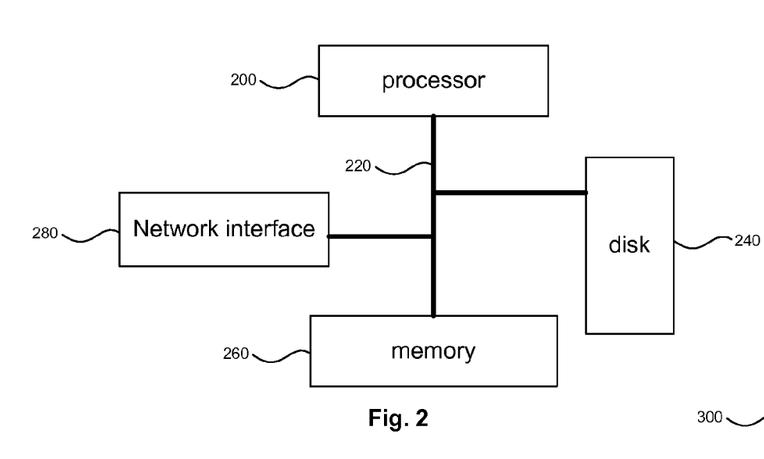
FIG. 2 Depicts a processor based system in one embodiment of the claimed subject matter.
Figure 3:
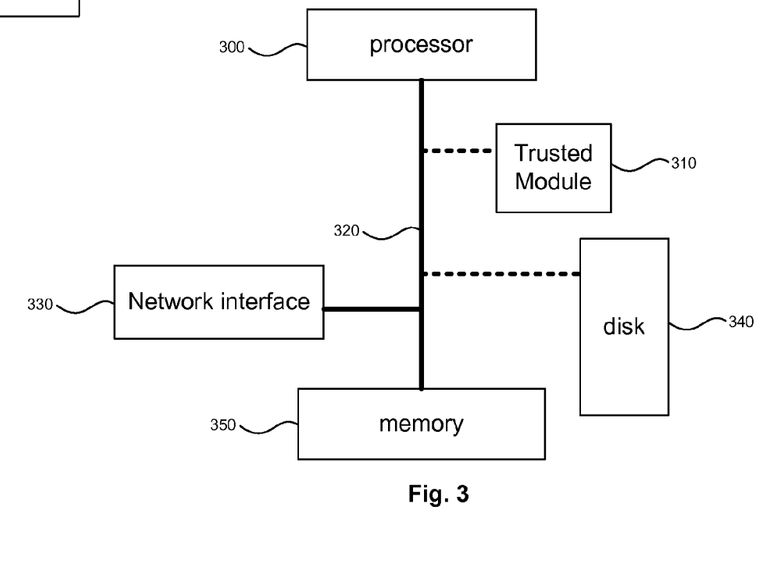
FIG. 3 Depicts a processor based system including a trusted module in one embodiment of the claimed subject matter.

FIGS. 2 and 3 depict two embodiments of a system including a secure device. In FIG. 2, the system is a processor based system including a processor 200, a memory 260 to store data and programs executable by the processor, a communication interface such as the network interface 280 that allows the system to communicate with other devices on a network, and a storage unit such as a disk 240 all interconnected by a bus system 220. In this system the secure device is embodied as a software program that is stored in the storage unit and loaded into memory and executed by the processor to perform the protocols described above, relating to the generation of certificates and their replacement. FIG. 3 represents another system including a secure device, however in this system the secure device is at least in part implemented as a hardware module termed a trusted module 310. As before the system includes a processor 300, interface 330, memory 350 and disk 340, but additionally includes the trusted module 310 implemented in hardware. In the system of FIG. 3, the operation of the secure device is performed at least in part by the trusted module and optionally by software loaded from the disk and stored in the memory to be executed by the processor. In an exemplary system, the trusted module may generate secret identities, provide security attribute information regarding the system and perform blinding and one way function generation to generate blinded identities; while the software portion of the secure device might initiate communication with outside entities and call upon the trusted module only for the functions listed above.

Many other implementations are, of course, possible, including, in one instance an embodiment where the secure device is implemented entirely as a logic circuit and does not have an architecture as depicted in FIGS. 2 and 3.

While certain exemplary embodiments of the invention have been described above and shown in the accompanying drawings, it is to be understood that such embodiments are merely illustrative of and not restrictive on the broad aspects of various embodiments of the invention, and that these embodiments not be limited to the specific constructions and arrangements shown and described, since various other modifications are possible. It is possible to implement the embodiments of the invention or some of their features in hardware, programmable devices, firmware, software or a combination thereof.

Embodiments in accordance with the claimed subject matter may be provided as a computer program product that may include a machine-readable medium having stored thereon data which when accessed by a machine may cause the machine to perform a process according to the claimed subject matter. The machine-readable storage medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable storage medium suitable for storing electronic instructions. Moreover, embodiments of the claimed subject matter may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the invention but to illustrate it. The scope of the claimed subject matter is not to be determined by the specific examples provided above but only by the claims below.

What is claimed is:

1. A method comprising:
   detecting, at a manufacturing entity, that a signing key has been compromised, wherein the manufacturing entity has used the signing key to authenticate one or more secure devices; and
   providing, from the manufacturing entity to a replacement authority, a blinded identity ticket associated with a first secure device having a certificate to be replaced due to the compromise, wherein the blinded identity ticket is separate from the certificate that is to be replaced for the first secure device, wherein the manufacturing entity is separate from the replacement authority and the replacement authority is to authenticate the first secure device and provide a new certificate to the first secure device.

2. The method of claim 1 further comprising at a time prior to detecting the compromise:
   receiving a blinded identity and the blinded identity ticket from the first secure device;
   signing the blinded identity using the signing key to create a blinded identity signature for the first secure device; and
   sending the blinded identity signature to the first secure device to enable the first secure device to obtain the certificate.

3. The method of claim 2 further comprising:
   obtaining and storing a time stamp on the received blinded identity ticket from the first secure device, wherein the time stamp is a time of signing the blinded identity signature.

4. The method of claim 3 further comprising:
   in response to the detection that the signing key has been compromised, providing a time of the compromise of the signing key to the replacement authority; and
   wherein the first secure device is to provide the time stamp on the received blinded identity ticket to the replacement authority.

5. The method of claim 1 wherein the first secure device generates the blinded identity ticket using a secret identity of the first secure device, the secret identity generated by the first secure device.

6. A method comprising:
   receiving, at a replacement authority from a manufacturing entity, a time of compromise of a signing key and a blinded identity ticket associated with a first secure device that is to be authenticated with another signing key having a certificate to be replaced due to the compromise, the blinded identity ticket separate from the certificate for the first secure device;
   comparing a time stamp on the blinded identity ticket associated with the first secure device with the time of compromise of the signing key; and
   authenticating the first secure device and providing a new blinded identity signature to the first secure device in response to determining that a time of signing the blinded identity ticket for the first secure device with the signing key indicated by the time stamp on the blinded identity ticket is earlier than the time of compromise of the signing key, wherein the replacement authority is separate from the manufacturing entity.

7. The method of claim 6 further comprising:
   receiving a blinded identity and a second blinded identity ticket from the first secure device; and
   signing the blinded identity using a second signing key to create the new blinded identity signature for the first secure device.

8. A non-transitory machine-readable medium having stored thereon instructions, which if performed by a machine of a manufacturing entity cause the machine to perform a method comprising:
   detecting, at the manufacturing entity, that a signing key has been compromised, wherein the signing key has been used to authenticate a first secure device; and
   providing, from the manufacturing entity to a replacement authority, a blinded identity ticket associated with the first secure device having a certificate to be replaced due to the compromise, the blinded identity ticket separate from the certificate that is to be replaced for the first secure device, wherein the manufacturing entity is separate from the replacement authority and the replacement authority is to authenticate the first secure device and provide a new certificate to the first secure device.

9. The non-transitory machine-readable medium of claim 8 wherein the method further comprises at a time prior to detecting the compromise:

receiving a blinded identity and the blinded identity ticket from the first secure device;

signing the blinded identity using the signing key to create a blinded identity signature for the first secure device; and sending the blinded identity signature to the first secure device to enable the first secure device to obtain the certificate.

10. The non-transitory machine-readable medium of claim 9 wherein the method further comprises:

obtaining and storing a time stamp on the received blinded identity ticket from the first secure device, wherein the time stamp is a time of signing the blinded identity signature.

11. The non-transitory machine-readable medium of claim 10 wherein the method further comprises:

in response to the detection that the signing key has been compromised, providing a time of the compromise of the signing key to the replacement authority; and wherein the first secure device is to provide the time stamp on the received blinded identity ticket to the replacement authority.

* * * * *